United States Patent Office 2,821,250
Patented Jan. 28, 1958

2,821,250

ROTATING SHEARING DEVICE

Harry Sigurd Valdemar Järund, Lund, Sweden, assignor to Hermorian Ltd., Toronto, Ontario, Canada, a company of Canada Application April 11, 1955, Serial No. 500,584

Claims priority, application Sweden April 15, 1954

7 Claims. (Cl. 164—42)

This invention concerns a rotating shearing device for cutting pieces of the same size from a continuous strip or band, so that the lines of cutting will run at right angles to the direction of motion of the strip or band.

In a more particular way, the invention concerns a shearing device for continuous strands of packages with intermediate zones of sealing, which package strands are produced by compressing and sealing sleeve formed elements, with mutually equal distances between the sealing zones, which principally run at right angles to the direction of motion of the strand. A special embodiment or application of the invention is further contemplated for separating of individual packages from a continuous strand of tetrahedrally formed packages, where the sealing zones, lying at right angles to the longitudinal direction, alternately lie in right angle directions against each other. Such strands of tetrahedrally formed packages could for instance be produced according to the construction described and illustrated in United States patent application Serial No. 265,357, filed December 26, 1951, now U. S. Patent No. 2,738,631, granted March 20, 1956.

Another object of the invention is to produce a machine, which cuts through the sealing zones, while the strand is continually moving, without the necessity of the zone to be cut through being kept standing still during the cutting operation.

A further object is to accomplish the cutting principally without striking action, as a shearing motion, where the shearing point passes continuously through the zone to be cut through, principally in a straight line, across the longitudinal direction of the strand.

For obtaining the above mentioned objects and other advantages, which will become evident from the following detailed description, the cutting device according to the invention is characterized, principally in a rotatably arranged shear wheel, equipped with axially extending principally linear knife edges, principally equally spaced around the circumference, which wheel in the following will be called a shear wheel, where these straight knife edges lie at a mutual distance apart, equal to the distance between two consecutive parallel cuts to be made, and in at least one, in relation to its rotating axle, obliquely placed cutting edge, which edge is arranged for rotation in the opposite direction to the shear wheel on an axle parallel to the axle of the shear wheel, and located so, that its front end, when rotating, will reach shearing contact with one of the outer ends of a co-working straight edge on the one side of the symmetrical plane through the two rotating axles and at some distance from this symmetrical plane, and so that the contact point between this straight edge and the oblique edge at continued rotation will slide along the edges, in order to be at the center points of the two co-working edges in the symmetrical plane, and cease to slide at an equal distance on the other side of the symmetrical plane at the opposite ends of the edges. In the case of the arrangement being for the purpose of cutting off individual tetra-hedrally formed packages from a continuous strand of wrappings, with alternately axially and radially aligned sealing zones, radially operating shears are also arranged between each pair of adjacent straight edges in said shear wheel for shearing of the radially aligned sealing zones.

The rotating shear arrangement according to the above will thus shear with two systems of knives with principally linear edges, rotating in opposite directions around each of two parallel axles. The shearing takes place, when one knife edge from the one system during part of one revolution will slide over a cooperating knife edge of the other system. The center points of two cooperating knife edges will reach each other while in motion in a symmetrical plane through the rotating axles of the two knife systems. The projections of the two knife edges on this symmetrical plane will herewith coincide, parallel to the axles. If now in this position the knives are projected on a plane through one of the axles, at right angles to the symmetrical plane, the projection of the one knife edge will coincide with the axle, while the projection of the cooperating edge will form an angle with the axle. For this reason the knife edge parallel to the axle is called the straight edge and the cooperating one is called the oblique edge.

If the distance of the straight knife or the knife parallel with the rotating axle from the rotating axle is called R and the distance from the center point of the oblique knife to its rotating axle is called r, and the distance between the rotating axles is called A, the primary condition for cutting action to take place is:

$$R+r=A$$

A second condition is, that the oblique knife edge must travel so much faster than the knife edge parallel to the axle, that the oblique knife edge, while the straight knife edge moves in the angle under which the shearing occurs, must move in a corresponding angle plus the angular distance between the outer ends of the oblique knife.

A further condition when cutting a strand running with the shearing zones contacting the straight knife edges is, that the two knife systems must rotate in opposite directions and that their center points must meet in the symmetrical plane, through the axles.

The invention will in the following be further described with reference to the enclosed drawings, which show a device for cutting individual packages from a continuous strand of tetrahedrally formed packages. If the device is to be used only for shearing in a direction parallel to the rotating axles of the shear edges, the radially operating shears are obviously not necessary and may, together with their actuating devices, be omitted. Such an application is thought to be so obvious from the drawings, that special illustrations eliminating the radially operated shears is considered unnecessary.

In the drawings as shown:

Figure 7A:
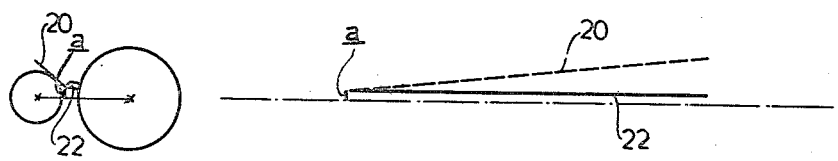
Figure 7B:
Figure 7C:
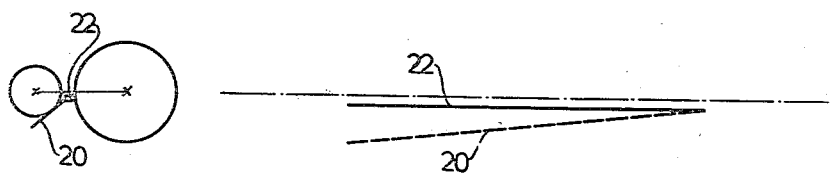

Fig. 7 finally illustrates schematically three positions 7a, 7b and 7c for shearing in a direction axially of the shear wheel.

On the drawings 2 signifies a machine stand, which is also formed into a protecting housing around the shear device itself. In this machine stand an axle 4 is solidly arranged, on which is placed a shear wheel rotatably supported on ball bearings, and consisting of a hub 6 and two discs 8 and 10. In the shown arrangement the hub part 6 is integral with the disc 8. The disc 8 also carries a sprocket 12 for driving the shear wheel and a concentric gear 14 for the transmission of driving power to a shear roller 16, supported by bearings at the stand 2 at the same height as axle 4, through a pinion gear 18, arranged on the shear roller 16. The shear roller is equipped with a shear edge 20 oblique to the axial direction of the roller and which is suitably adjustable and interchangeable, while the shear wheel, composed of the discs 8, 10 is equipped with straight axially extending shear edges 22 with a pitch corresponding to the distance between two consecutive joints, running in the same direction, between the packages in the continuous package strand. The gearing ratio between the two gears 14 and 18 shown in the design is such, that the shear roller 16 turns one revolution, while the shear wheel composed of the two discs 8, 10 turns through an angle corresponding to the distance between two consecutive axial edges 22.

Figure 3:
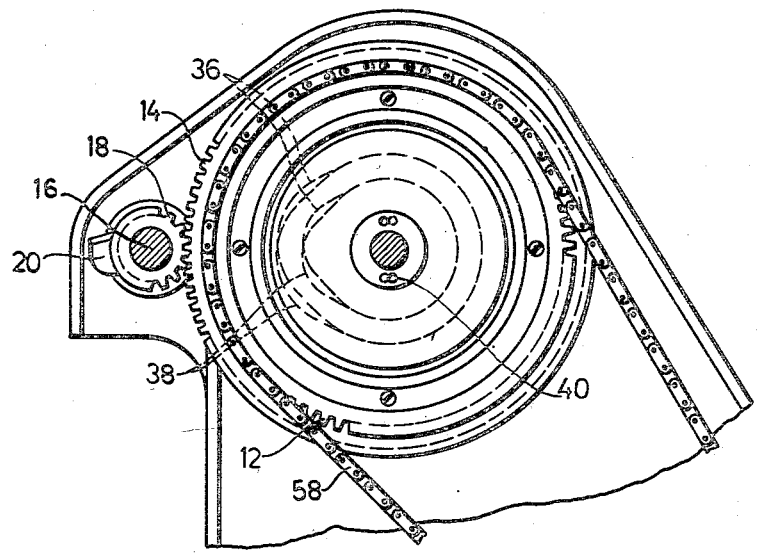
Fig. 3 is to smaller scale the device according to Fig. 1 seen from the right with the protecting housing removed.

Between the two discs 8 and 10 is arranged, between each pair of adjacent axial shear edges 22, a shear 24 operating in a radial direction, consisting of two shear shanks or edges 26, 26' rotatable round axles 28, which are arranged in grooves 30 in the disc 10 of the shear wheel, or in both discs 8 and 10. In order to obtain the shearing motion of the shears 24, both shanks 26, 26' are equipped with angular projecting arms 32 and 32' respectively, the ends of which 34, 34' are spherically rounded. The spherically rounded ends 34, 34' are located in grooves 36, 38 constructed in two groove discs 42 and 44, supported by axle 4 and screwed into the stand 2 by machine screws 40. In order that the shear shanks may be constructed exactly alike, the two grooves 36 and 38 must be somewhat angularly displaceable in relation to each other, as is indicated with dotted lines 36 and 38 respectively in Fig. 3, because in this case the spherically rounded ends 34, 34' in each shear 24 will be radially displaced in relation to each other. Naturally it is even possible, although more complicated, to avoid the angular displacement between the shearing grooves 36 and 38, by bending one or both angular arms 32, 32', so that the connecting line between the centers of the two rounded ends 34, 34' in both shears 24 will be parallel to the axle 4 of the shear wheel. In the two discs 8 and 10 respectively comprising the shear wheel, holes or openings 46 and 48, respectively, are arranged, through which the arms 32 of the shear shanks will pass.

The two discs 8, 10 comprising the shear wheel are mutually connected with screws 50 and, further, ring formed protecting flanges 54 are fastened on both sides of the shear wheel with screws 52, which flanges contain packings 56. The shear wheel is driven by means of a chain 58 running over the sprocket 12, suitably from the machine, where the continuous package strand is manufactured.

Figure 4:
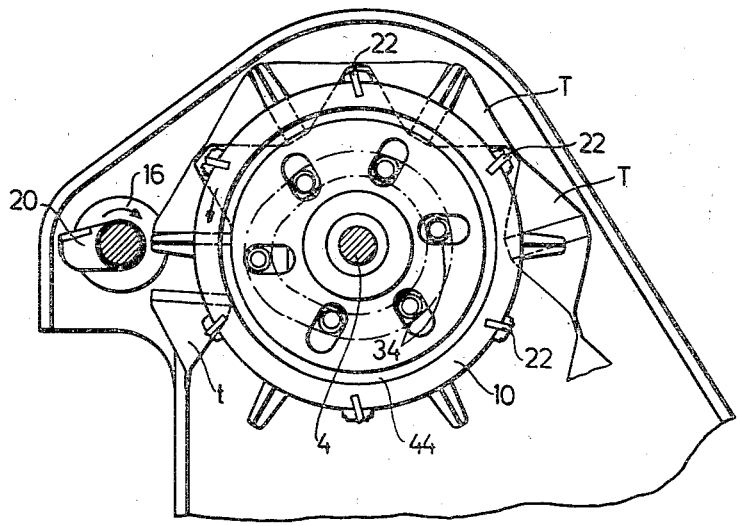
Fig. 4 is a corresponding view to Fig. 3 but with driving wheel and gear transmission removed.
Figure 5:
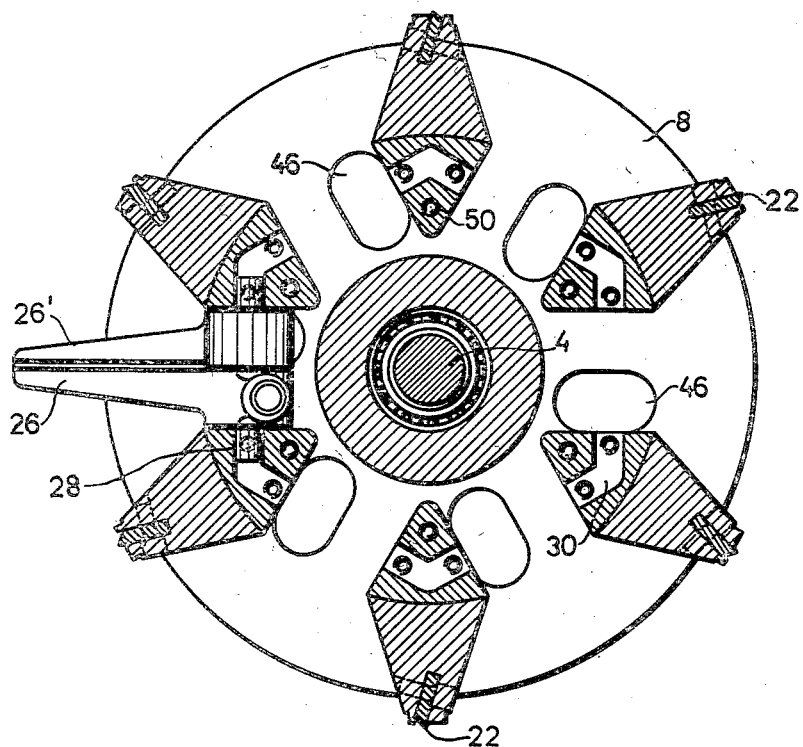
Figs. 5 and 6 are details of two discs from which the shear wheel is made.
Figure 6:
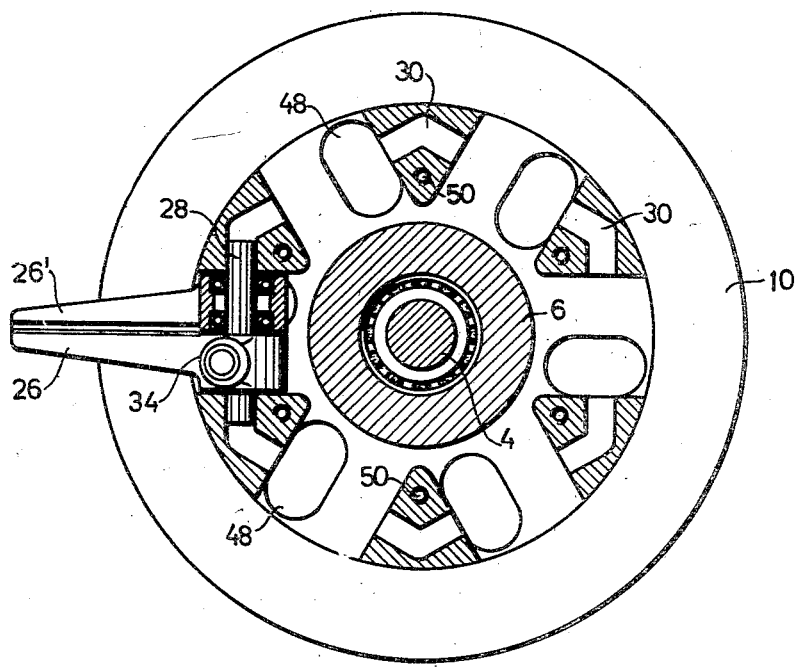

The operation of the device is as follows:

A continuous strand of adjoining packages, in Fig. 4, is marked T and in this figure shown as a strand of tetrahedrally formed packages, is placed over the shear wheel in such a manner that the joints running in the direction of the axle of the shear wheel, that is to say, every other joint between the tetrahedrally formed wrappings in the strand T, will lie against the shearing edges 22, while the intermediate joints will be radially aligned. Then the machine is started, so that the shear wheel is rotated by driving power applied to the chain 58 over the sprocket 12. With this, the tetrahedrally formed strand T will travel along with the wheel in the direction of the shear roller 16. When an edge 22 lying in the axial direction with a joint in the tetrahedrally formed package strand T lying against it, will reach the distance $a$ above the common axle plane for the shear roller 16 and the shear wheel, the shear edge 20 will start cutting through the joint against one of the outer ends of the shear edge 22, fastened in the shear wheel, whereafter shearing motion continues as illustrated in the positions $a$, $b$ and $c$ in Fig. 7, namely so that during the rotating motion the contact point between the shearing edges 20 and 22 will move in an axial direction along the shear wheel.

Figure 1:
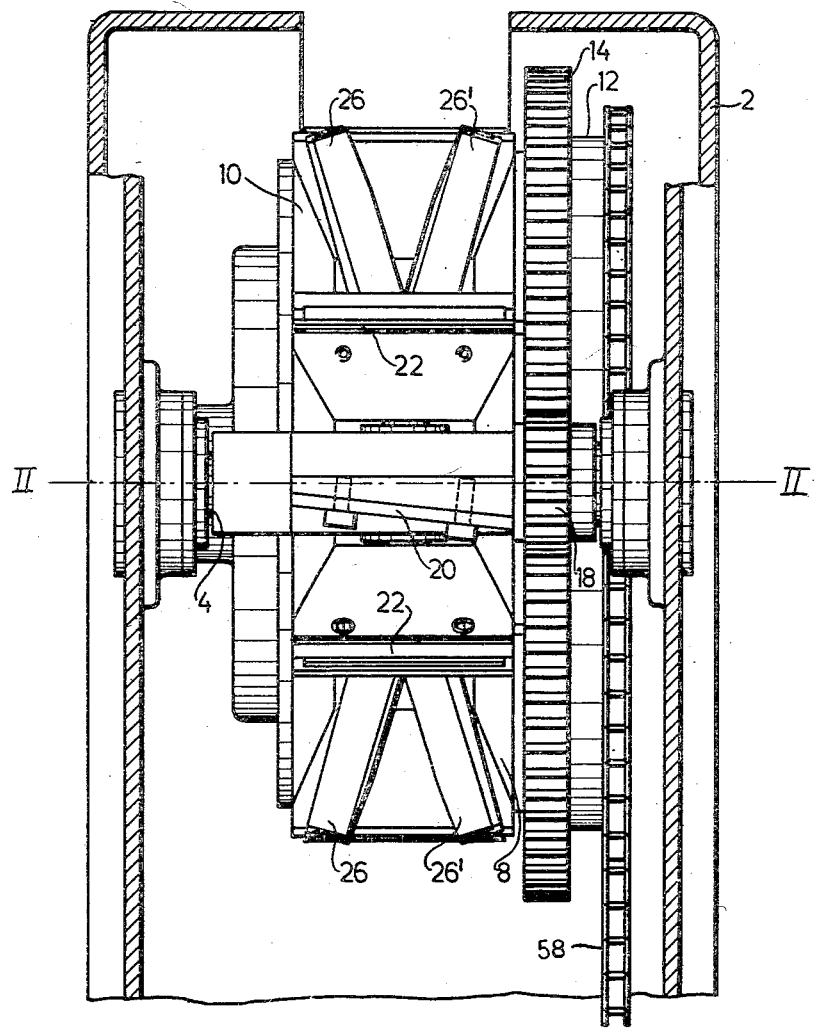
Fig. 1 is a device according to the invention, seen from the front, the surrounding protecting housing partly cut away.
Figure 2:
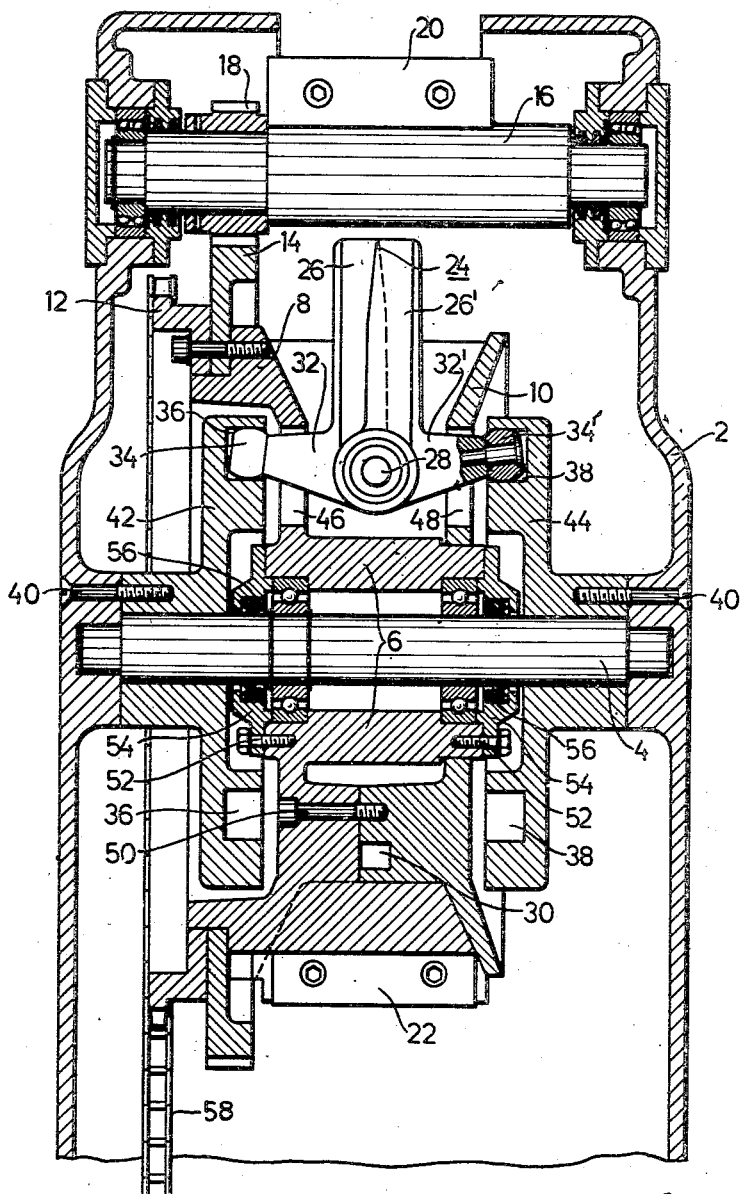
Fig. 2 is a section on line II—II on Fig. 1.

With continued rotation motion the shear wheel will arrive at the position as illustrated in Fig. 4, when the edge of the shear roller 16 is farthest away from the shear wheel. In this position the rounded ends 34, 34' of the angular arms 32, 32' of a shear 24 have moved to the top of the grooves 36 and 38, which means, that said rounded ends are in a position of maximum distance from the axle of the shear wheel 4, in which position the shear shanks 24 and 26 are brought together, which means that the shearing is finished. This position is also illustrated in Fig. 2. Through this shearing motion the outermost tetrahedrally formed package $t$ has been sheared off as shown in Fig. 4. With continued rotation the rounded ends 34, 34' on the angular arms 32, 32' of the shear shanks will again move in the grooves 36 and 38 respectively towards the axle of the shear wheel, which means that the shear 24 will again open and remain open until, during continued rotation, the same shear will again perform a shearing motion.

The strand of adjoining packages if they are not too heavy, may be brought over, hanging free from a machine for the manufacture of the packages, to the shear wheel, but, if so desired, a chute or a chain conveyor may also be provided for this purpose, running over sprockets fitted on the shear wheel.

I claim:

1. A rotating shearing device for shearing off individual packages from a continuous strand of tetrahedrally formed packages with consecutively formed sealing zones between individual packages arranged in mutually perpendicular planes, comprising a shear wheel mounted for rotation, said wheel having a plurality of cutting members spaced uniformly around the circumference of said shear wheel, said cutting members extending parallel to the axis of rotation of said shear wheel and the distance therebetween being equal to the distance between successive sealing zones in the same plane on said strand of tetrahedrally formed packages, a roller mounted for rotation with and in the opposite direction of said shear wheel on an axis parallel to the axis thereof, said roller having at least one cutting member cooperating in succession with each of said cutting members on said shear wheel to effect a cutting of those sealing zones of said strand of tetrahedrally formed packages as lie parallel to and in contact with the cutting members of said shear wheel, said shear wheel also including a plurality of radially acting shearing means between each pair of adjacent axially extending cutting members on said shear wheel, said radially acting shearing means being located in alignment respectively with the other sealing zones of said strand of tetrahedrally formed packages which lie radial to the axis of said shear wheel, and means for actuating each of said radially acting shearing means in succession between successive shearing actions effected by said cutting member on said roller.

2. A rotating shearing device as defined in claim 1 and wherein said radially acting shearing means are constituted by two cooperative shear members pivotally mounted such that the knife edges thereof move toward each other in a plane containing the axis of said shear wheel, the contact point between the edges of said shear members being movable progressively radially outward along said edges.

3. A rotating shearing device as defined in claim 2 wherein each of said pivotally mounted radially acting shear members includes a lever arm extending outwardly from said pivot means, said lever arms extending in opposite directions axially of said shear wheel, and a stationary grooved disc individual to each of said lever arms, the outer ends of said lever arms being received in and guided by the grooves in said disc thereby to effect actuation of said radially acting shear members as said shear wheel rotates.

4. A rotating shearing device as defined in claim 3 wherein all of said lever arms are alike and the grooves in said discs are angularly turned in relation to each other such that the two arms of the same radially acting shear will during rotation of said shear wheel simultaneously enter curved portions of their respectively associated grooves for the shearing motion.

5. A rotating shearing device as defined in claim 3 wherein the lever arms of said radially acting shear members are provided with spherically formed surfaces at their outer ends which engage the walls of the grooves in said discs.

6. A rotatable shearing device as defined in claim 3 wherein the lever arms of said radially acting shear members pass through openings in the end walls of said rotating shear wheel and engage the grooves in said discs.

7. A rotating shearing device as defined in claim 1 wherein said cutting member on said roller includes a straight cutting edge located in a plane lying at an acute angle with respect to the roller axis of revolution.

References Cited in the file of this patent
UNITED STATES PATENTS

| | | |
|---|---|---|
| 370,672 | Bacon | Sept. 27, 1887 |
| 2,328,164 | Perkins | Aug. 31, 1943 |
| 2,478,243 | Christman | Aug. 9, 1949 |
| 2,568,333 | Henschker et al. | Sept. 18, 1951 |
| 2,642,135 | Regalia | June 16, 1953 |

FOREIGN PATENTS

| | | |
|---|---|---|
| 812,172 | France | Jan. 27, 1937 |